US010309480B2

(12) United States Patent
Snyder et al.

(10) Patent No.: US 10,309,480 B2
(45) Date of Patent: Jun. 4, 2019

(54) HYDRAULIC DAMPER FOR A MOUNT ASSEMBLY

(71) Applicant: COOPER-STANDARD AUTOMOTIVE INC., Novi, MI (US)

(72) Inventors: Curtis Snyder, Lucan (CA); Eric Gueno, Vezin le Coquet (FR)

(73) Assignee: ContiTech USA, Inc., Fairlawn, OH (US)

( * ) Notice: Subject to any disclaimer, the term of this patent is extended or adjusted under 35 U.S.C. 154(b) by 0 days.

(21) Appl. No.: 15/682,888

(22) Filed: Aug. 22, 2017

(65) Prior Publication Data

US 2018/0058535 A1     Mar. 1, 2018

Related U.S. Application Data

(60) Provisional application No. 62/380,682, filed on Aug. 29, 2016.

(51) Int. Cl.
| | | |
|---|---|---|
| *F16F 1/00* | (2006.01) | |
| *F16F 13/08* | (2006.01) | |
| *F16F 9/49* | (2006.01) | |
| *F16F 15/02* | (2006.01) | |
| *F16F 15/027* | (2006.01) | |
| *F16F 13/10* | (2006.01) | |

(Continued)

(52) U.S. Cl.
CPC .............. *F16F 13/085* (2013.01); *F16F 9/49* (2013.01); *F16F 13/103* (2013.01); *F16F 15/022* (2013.01); *F16F 15/0275* (2013.01); *B62D 24/02* (2013.01); *B62D 25/088* (2013.01)

(58) Field of Classification Search
CPC .... F16F 13/085; F16F 13/1463; F16F 15/022; F16F 15/0275; F16F 1/00

USPC .... 267/140.13, 293, 294; 248/632, 634, 636
See application file for complete search history.

(56) References Cited

U.S. PATENT DOCUMENTS

| | | | |
|---|---|---|---|
| 8,002,252 B2 * | 8/2011 | Howorth | F16F 1/54 248/632 |
| 8,091,871 B2 | 1/2012 | Bradshaw et al. | |
| 9,097,310 B2 * | 8/2015 | Gaspar | F16F 13/1463 |

(Continued)

FOREIGN PATENT DOCUMENTS

| | | |
|---|---|---|
| DE | 10 2012 202312 A1 | 8/2013 |
| DE | 10 2014 226201 | 6/2016 |

OTHER PUBLICATIONS

Extended Search Report received in counterpart EU Application No. 17188201.2-1013 dated Jan. 25, 2018.

*Primary Examiner* — Christopher P Schwartz
(74) *Attorney, Agent, or Firm* — David L. Cate

(57) ABSTRACT

A hydraulic damper for a mount assembly includes a housing and a subassembly. The housing defines a cavity and is integrally formed to include a plurality of retention features. The subassembly is at least partially disposed in the cavity and is secured relative to the housing by the plurality of retention features. At least one of the plurality of retention features and the subassembly is elastically deformable in a radial direction from an initial diameter to an elastically deformed diameter such that the subassembly is sized to axially pass by the plurality of retention features in the initial diameter for insertion of the subassembly into the housing and the plurality of retention members radially extend over the subassembly in the elastically deformed diameter to secure the subassembly relative to the housing.

14 Claims, 9 Drawing Sheets

(51) Int. Cl.
  *B62D 24/02*  (2006.01)
  *B62D 25/08*  (2006.01)

(56) References Cited

U.S. PATENT DOCUMENTS

| | | | |
|---|---|---|---|
| 9,163,695 B2 * | 10/2015 | Saito | F16F 13/1463 |
| 9,885,410 B2 * | 2/2018 | Rosendahl | B60K 5/1208 |
| 2012/0267184 A1 | 10/2012 | Joly et al. | |

* cited by examiner

HYDRAULIC DAMPER FOR A MOUNT ASSEMBLY

CROSS-REFERENCE TO RELATED APPLICATION

This is a non-provisional application claiming the benefit of U.S. Patent Application No. 62/380,682 filed provisionally on 29 Aug. 2016. The entire disclosure of U.S. Patent Application No. 62/380,682 is incorporated herein by reference.

FIELD

The present disclosure generally relates to hydraulic mount assemblies. The present disclosure more particularly relates to a hydraulic mount assembly with a hydraulic damper having at least one subassembly snap-fit to a housing.

BACKGROUND

This section provides background information related to the present disclosure which is not necessarily prior art.

Various assemblies that dampen vibrations and relative movement between components are known in the art. Many of these arrangements use an elastomer or natural rubber material disposed between first and housing portions that are secured to first and second vehicle components. It is desirable to limit vibration from the first component to the second component, for example, between a first component such as an automotive frame and a second component such as an engine. For example, an engine mount assembly includes a first housing portion mounted to the frame and a second housing portion secured to the engine and a material such as an elastomer or rubber interposed between the first and second housing portions that dampens the vibrations.

One known assembly for dampening vibrations is shown and described in commonly assigned U.S. Pat. No. 8,091,871. This patent is directed to a hydraulic mount assembly including a first fluid chamber and a second fluid chamber that communicate with one another through an inertia track. The inertia track is interposed between the first and second fluid chambers, and is used as a fluid actuating plunger to move relative to at least one of the first and second chambers in response to vibration to pump fluid from the first chamber to the second chamber, and vice versa, through the inertia track. An opening extends through the first and second fluid chambers and the inertia track and receives a shaft therein. The inertia track is secured to the shaft so that axial movement of the shaft results in axial movement of the inertia track. U.S. Pat. No. 8,091,871 is incorporated by reference as if fully set forth here.

While known hydraulic mount assemblies, including the embodiments shown in U.S. Pat. No. 8,091,871 have proven to be acceptable for their intended purpose, a need for continuous improvement in the relevant art remains.

SUMMARY OF THE DISCLOSURE

This section provides a general summary of the disclosure, and is not a comprehensive disclosure of its full scope or all of its features.

According to one particular aspect, the present teachings provide a hydraulic damper for a mount assembly. The hydraulic damper includes a housing and a subassembly. The housing defines a cavity and is integrally formed to include a plurality of retention features. The subassembly is at least partially disposed in the cavity and is secured relative to the housing by the plurality of retention features. At least one of the plurality of retention features and the subassembly is elastically deformable in a radial direction from an initial diameter to an elastically deformed diameter such that the subassembly is sized to axially pass by the plurality of retention features in the initial diameter for insertion of the subassembly into the housing and the plurality of retention members radially extend over the subassembly in the elastically deformed diameter to secure the subassembly relative to the housing.

According to another particular aspect, the present teachings provide a hydraulic damper for a mount assembly including a housing and a subassembly. The housing defines a cavity and is integrally formed to include a plurality of radial projections. The radial projections each including a radially innermost portion on an imaginary circle having an imaginary circle diameter. The subassembly includes a washer, an inertia track circumferentially surrounding the washer and a compliance member circumferentially surrounding the inertia track. The compliance member is elastically deformable in a radial direction such that the subassembly has an initial diameter when free of outside forces and an elastically deformed diameter when subject to a radially directed force. The initial diameter is greater than the imaginary circle diameter and the elastically deformed diameter is less than the imaginary circle diameter such that the subassembly is able to axially pass the plurality of radial projections with the elastically deformed diameter and the radial projections extend over the subassembly in when the subassembly has the initial diameter.

According to another particular aspect, the present teachings provide a hydraulic damper for a mount assembly including a housing and a subassembly. The housing defines a cavity and is integrally formed to include a plurality of axially extending projections. The axially extending projections each including a radially innermost portion. The axially extending projections are elastically deformable such that the radially innermost portions are on a first imaginary circle having an initial diameter when the axially extending projections are free from outside forces and the radially innermost portions are on a second imaginary circular having an elastically deformed diameter when the axially extending projections are subject to a radial force. The subassembly is at least partially disposed in the housing and includes a shaft, a compliance member circumferentially surround the shaft, and an end cap carried at a radially outer portion of the compliance member. The subassembly includes an outer diameter that is greater than the initial diameter and less than the elastically deformed diameter such that the subassembly is able to axially pass by the plurality of retention features in the elastically deformed diameter for insertion of the subassembly into the housing and the plurality of retention members radially extend over the subassembly in the initial deformed diameter to secure the subassembly relative to the housing.

According to yet another particular aspect, the present teachings provide a method of assembling a hydraulic damper. The method includes elastically deforming one of the plurality of retention features and the subassembly with a radially directed force from an initial diameter to an elastically deformed diameter. The method additionally includes inserting the subassembly into the housing axially past the plurality of retention features. The method further includes removing the radially directed force to positioning the plurality retention features axially over the subassembly.

Further areas of applicability will become apparent from the description provided herein. The description and specific examples in this summary are intended for purposes of illustration only and are not intended to limit the scope of the present disclosure.

Still other features and benefits will be found in the following detailed description.

BEST DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
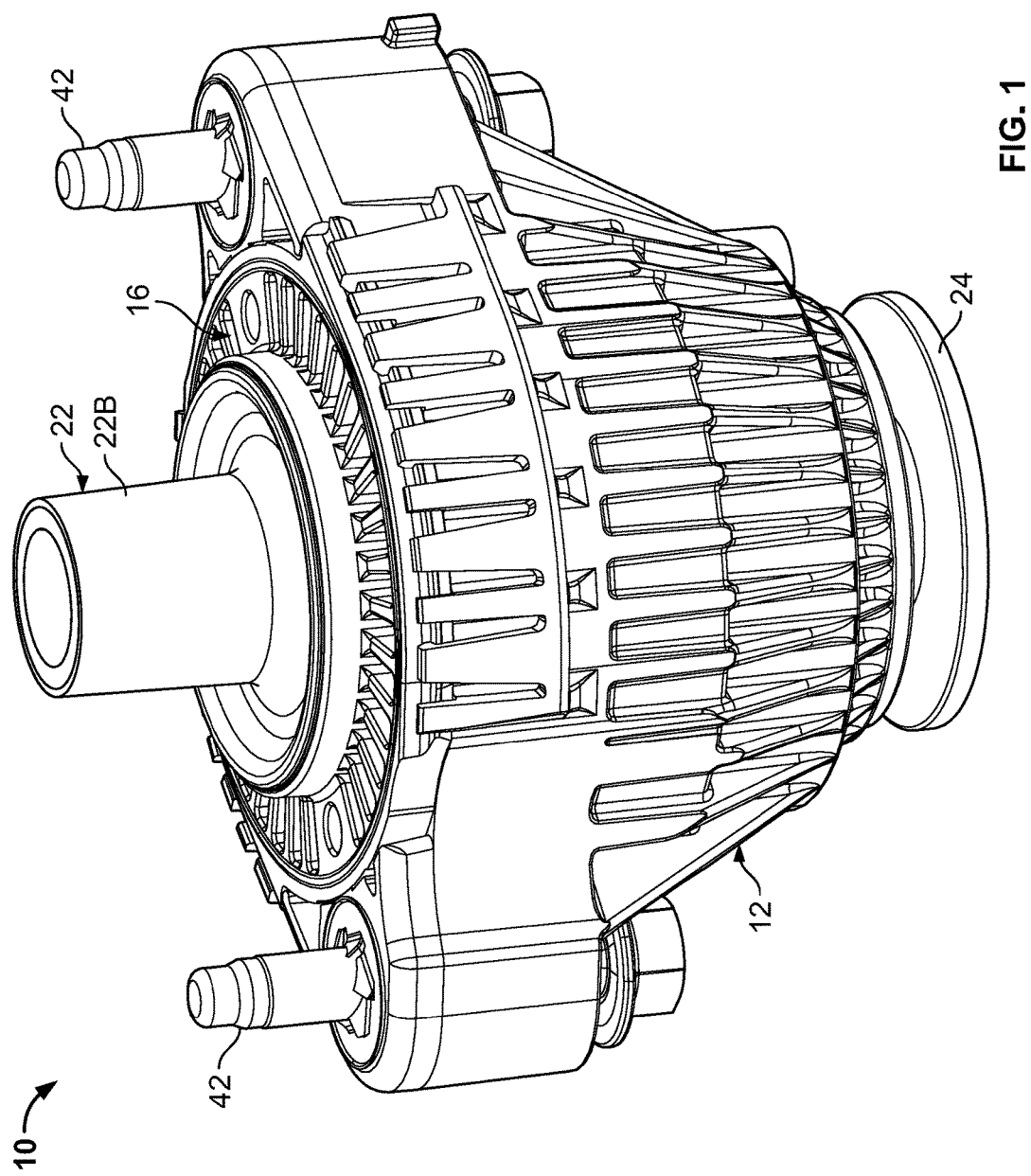
FIG. 1 is a perspective view of a hydraulic damper for a mount assembly in accordance with the present teachings.

Example embodiments will now be described more fully with reference to the accompanying drawings.

With general reference to the drawings, a hydraulic damper for a mount assembly constructed in accordance with the present teachings is illustrated and generally identified at reference character 10. In the general manner shown and described in common assigned U.S. Pat. No. 8,91,871, the hydraulic damper 10 is intended to be used with a load bearing body mount (not particularly shown herein) to limit vibration between first and second components of a vehicle, for example. It will be understood that the hydraulic damper 10 may be used for various other applications within the scope of the present teachings. It will be further understood that the particular load bearing body mount used with the hydraulic damper is beyond the scope of the present teachings.

The hydraulic damper 10, which may also be referred to as a lower mount assembly, is shown to generally include a housing 12. The hydraulic damper 10 is shown to further generally include a first subassembly 13, a second subassembly 14, and a third subassembly 16. As will be discussed further below, the housing 12 may be constructed to include retention features that cooperate with at least one of the subassemblies 13, 14 and 16 to receive and retain at least one of the subassemblies 13, 14 and 16 in a snap-fit.

Figure 3:
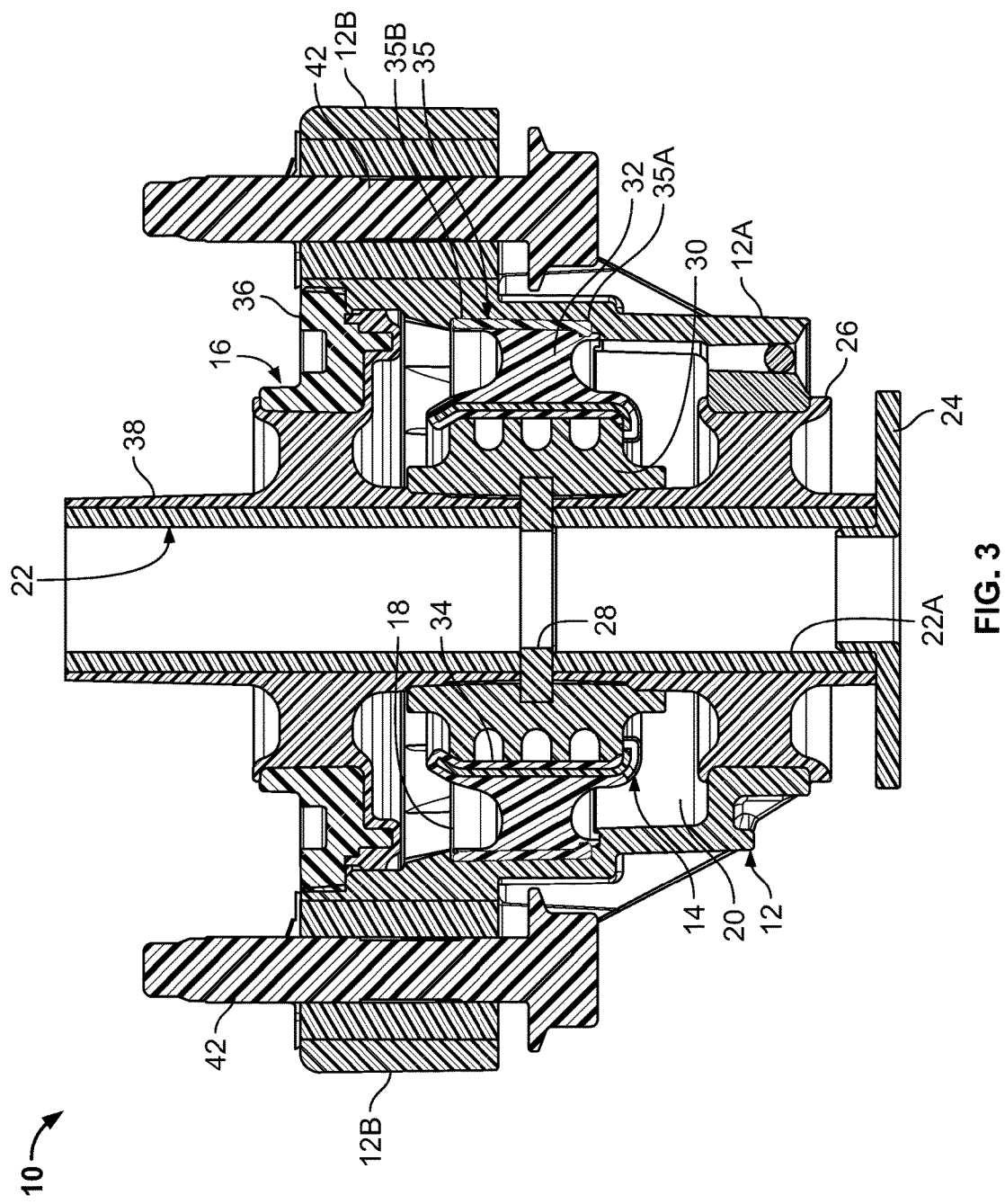
FIG. 3 is a cross-sectional view taken through the lower mount portion of a hydraulic mount assembly of FIG. 1.
Figure 4:
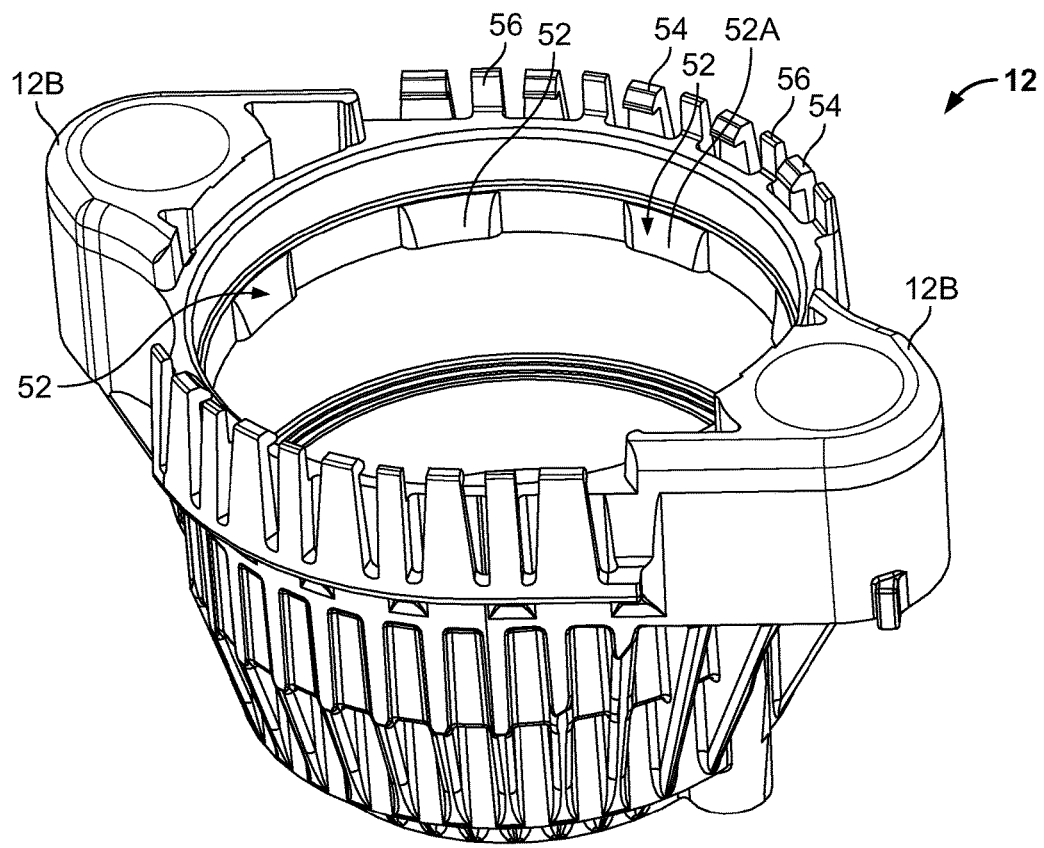
FIG. 4 is an enlarged perspective view of a housing of the hydraulic damper for a mount assembly of FIG. 1.

The hydraulic damper 10 may be "double pumping" design in which hydraulic fluid is forced back and forth by a pumping action between a first or upper fluid chamber 18 and a second or lower chamber 20 (see FIG. 3, for example). The general construction and operation of a double pumping hydraulic damper is known in the art and need not be described in detail herein. Various aspects of the present teachings, however, contribute to a unique arrangement that reduces weight, improves packaging, and improves assembly, among other advantages.

The first subassembly or lower assembly 13 may include a lower shaft portion 22A of a center shaft 22 of the hydraulic damper 10, a ferrule 24 and a first or lower compliance member 26. The first compliance member 26 may be formed of an elastomeric material or natural rubber. The first compliance member 26 circumferentially surrounds the lower shaft portion 22A and may be overmolded on the lower shaft portion 22A. The ferrule 24 and the lower shaft portion 22A may be constructed of metal. The ferrule 24 may be welded or otherwise suitable attached to the lower shaft portion 22A. Alternatively, the ferrule 24 may be formed with the lower shaft portion 22A.

Figure 6:
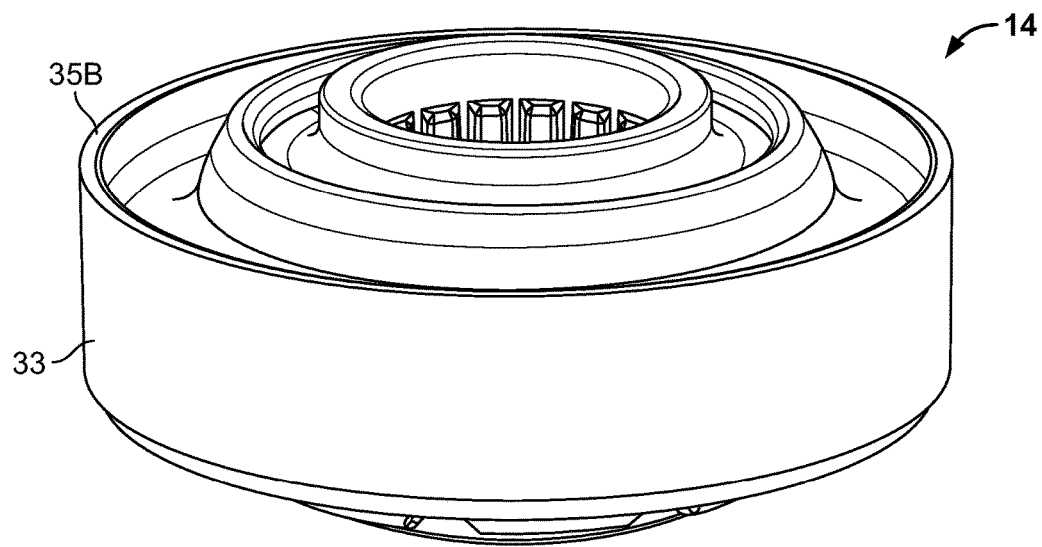
FIG. 6 is a perspective of a second subassembly of the hydraulic damper for a mount assembly of FIG. 1.
Figure 7:
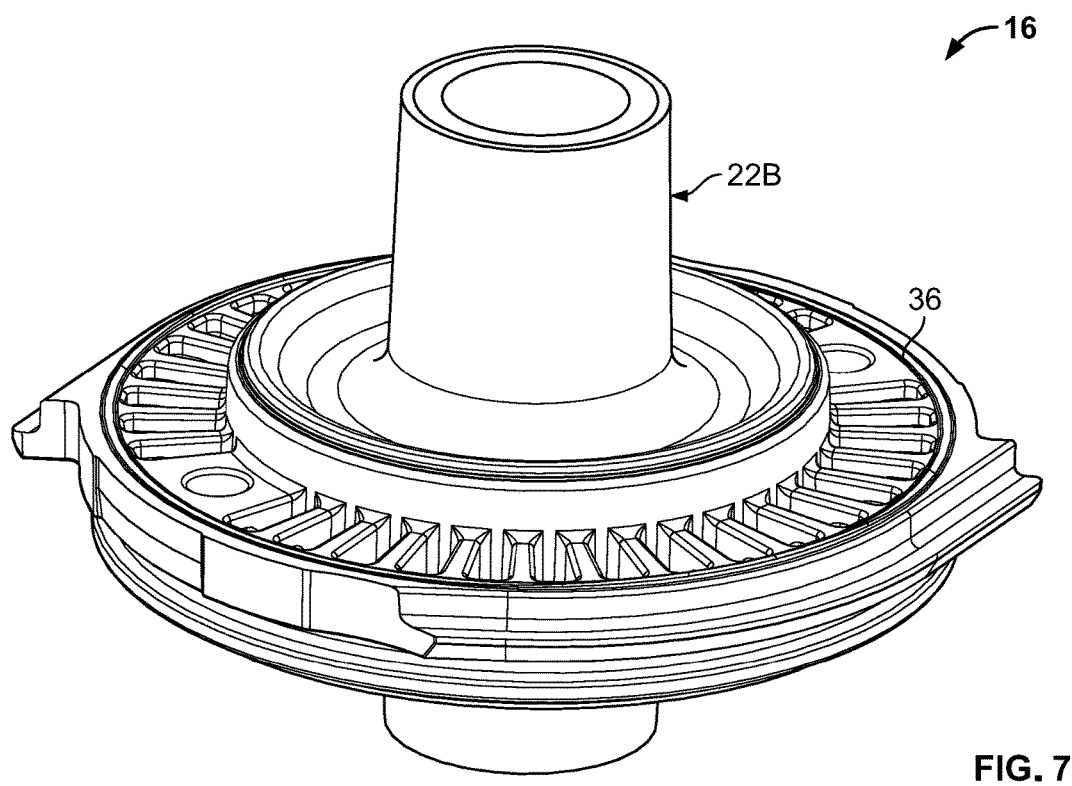
FIG. 7 is a perspective of a third subassembly of the hydraulic damper for a mount assembly of FIG. 1.

With particular reference to FIG. 6, the second subassembly 14 is shown removed from the hydraulic damper 10. The second subassembly or center subassembly 14 may include a washer 28 and an inertia track 30. The inertia track 30 circumferentially surrounds the washer 28 and may be overmolded to the washer 28. The second subassembly 14 may additionally include a second or center compliance member 32. The second compliance member 26 may be formed of rubber. Again, suitable materials include elastomeric materials or natural rubber. The second compliance member 26 may be connected to the inertia track 30 through a generally cylindrical rigid element or radially inner sidewall 34. The second subassembly 14 may further include a radially outer, rigid sidewall 35 that may be mold bonded to the second compliance member 32.

The third subassembly or upper subassembly 16 may include an end cap 36, a third or upper compliance member 38 and an upper shaft portion 22B of the center shaft 22. The third compliance member 38 may circumferentially surrounds the upper shaft portion 22B and may be overmolded on the upper shaft portion 22B. The third compliance member 38 may be formed of rubber. Again, suitable materials include elastomeric materials or natural rubber. The end cap 36 may be carried on an outer peripheral portion of the third compliance member 38.

In the illustrated embodiment, the upper fluid chamber 18 is bounded on an upper end by the third compliance member 38 and bounded on a lower end by the second compliance member 32. Similarly, the lower fluid chamber 20 is bounded on an upper end by the second compliance member 32 and bounded on a lower end by the first compliance member 26. The first and second fluid chambers 18 and 20 are separated by the inertia track 30. In the embodiment illustrated, the inertia track 30 is an elongated, serpentine interconnecting passage for damping vibrations between the upper and lower ends of the hydraulic damper 10. This damping is accomplished in a conventional manner insofar as the present teachings are concerned.

The housing 12 may constructed of a plastic material. While other materials may be used for the housing 12, one suitable material is Nylon 66. As shown in the illustrated embodiment, the housing 12 may be integrally formed. The housing 12 may include a generally cylindrical portion 12A defining a central axis A and a pair of mounting tabs 12B. As shown in FIGS. 1 and 3, the mounting tabs 12B may define holes 40 for receiving fasteners 42. The fasteners 42 may be mounting bolts for engaging an upper mount (not shown) of the assembly and securing the assembly to a vehicle, for example.

Figure 5:
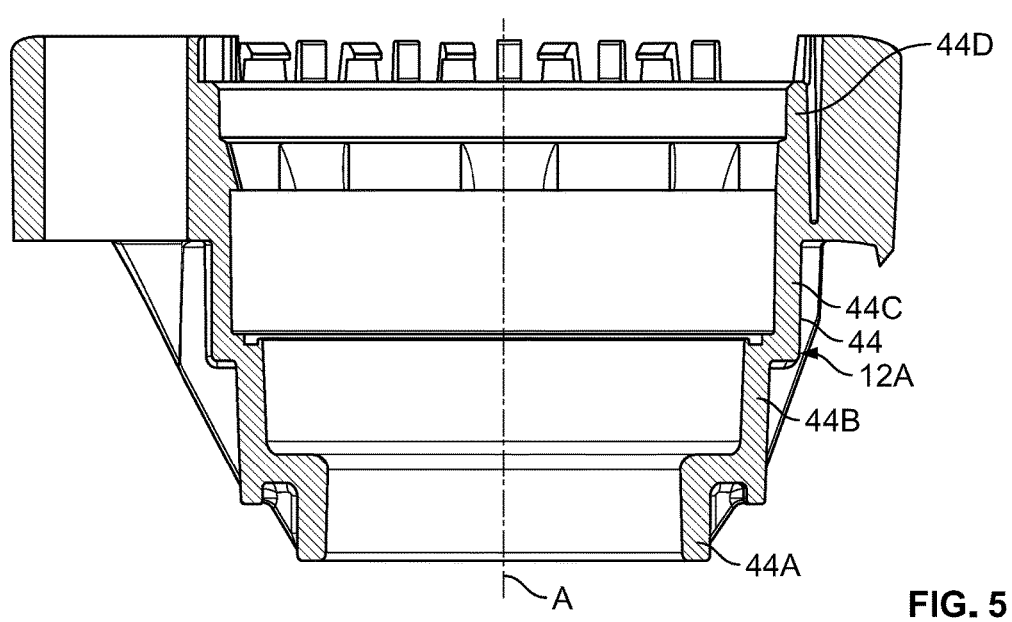
FIG. 5 is a cross-sectional view taken through the housing of FIG. 4.

The cylindrical portion 12A of the housing 12 may have a stepped configuration. As perhaps most clearly shown in the cross-sectional view of FIG. 5, the cylindrical portion 12A includes a sidewall 44 with a lowermost portion 44A defining a smallest diameter. Additional portions of the sidewall 44 are identified in the drawings at reference characters 44B, 44C, 44D and 44E. The diameters defined by the sidewall portions 44A-44E are shown to sequentially increase from the lowermost portion 44A in an upward direction. In the embodiment illustrated, the sidewall portions 44A-44E are shown to be oriented generally parallel to the central axis A. In other embodiments, the sidewall portions 44A-44E may be angled relative to the central axis A.

According to one particular aspect of the present teachings, final assembly of the hydraulic damper 10 may be accomplished quickly and easily with three general steps. The first, second and third subassemblies 13, 14 and 16 may be preassembly in such a manner that first, second and third subassemblies 13, 14 and 16 may be individually secured to the housing 12 as separate units (i.e., subassemblies).

Figure 8:
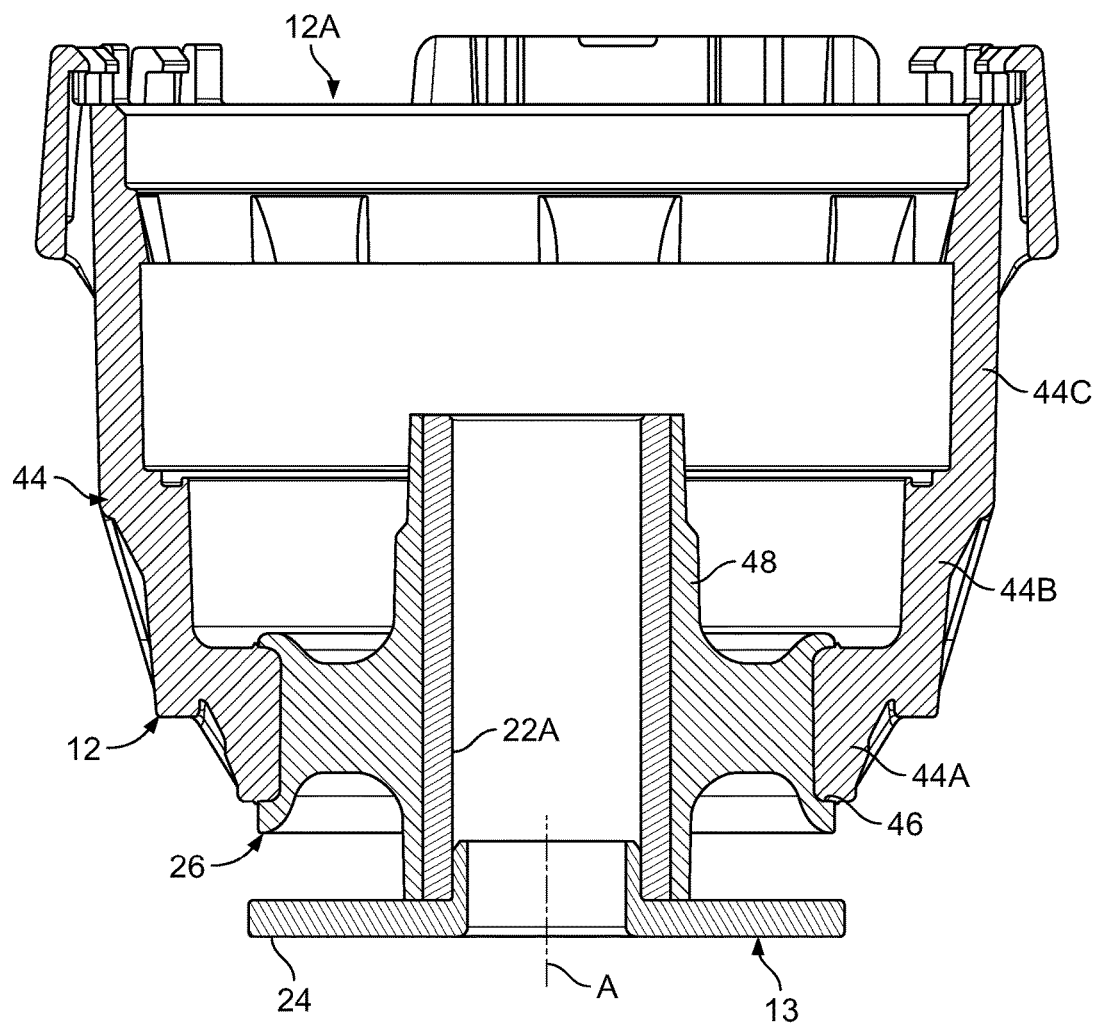
FIG. 8 is a cross-sectional view through the hydraulic damper of the present teachings after a first general assembly step with a first subassembly attached to the housing.
Figure 9:
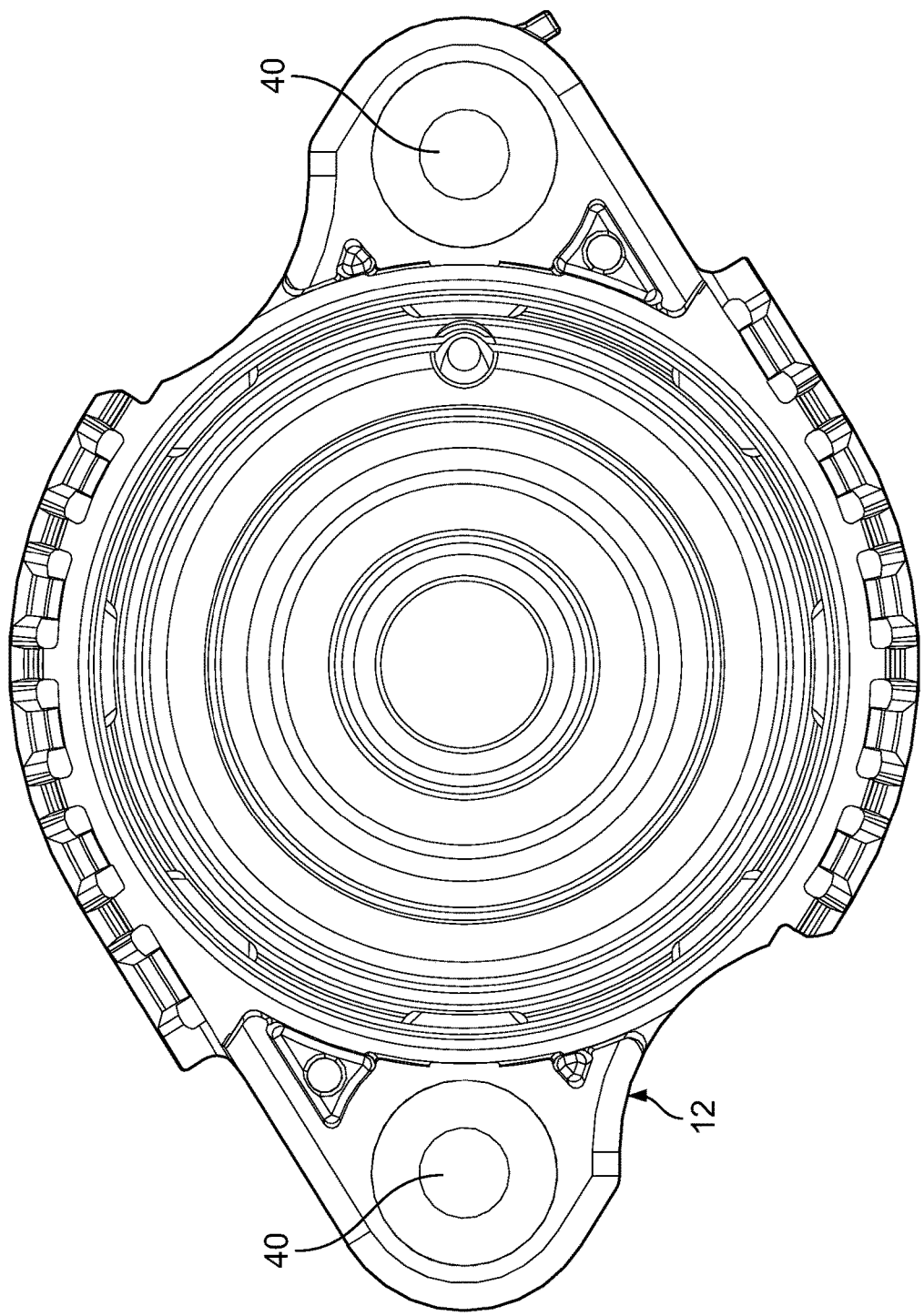
FIG. 9 is a top view of the hydraulic damper of the present teachings after the first general assembly step.

With particular reference to FIGS. 8 and 9, the hydraulic damper 10 of the present teachings is illustrated following a first general step in which the first subassembly 13 is attached to the housing 12. The first compliance member 26 defines a groove 46 in a radially outer surface thereof that receives the lowermost sidewall portion 44A of the housing 12. The lower portion 22A of the center shaft 22 is aligned with the longitudinal axis A. A radially inner portion 48 of the first compliance member 26 may extend substantially along the entire length of the lower portion 22A of the center shaft 22. At an upper end, the radially inner portion 48 of the first compliance member may taper.

Figure 10:
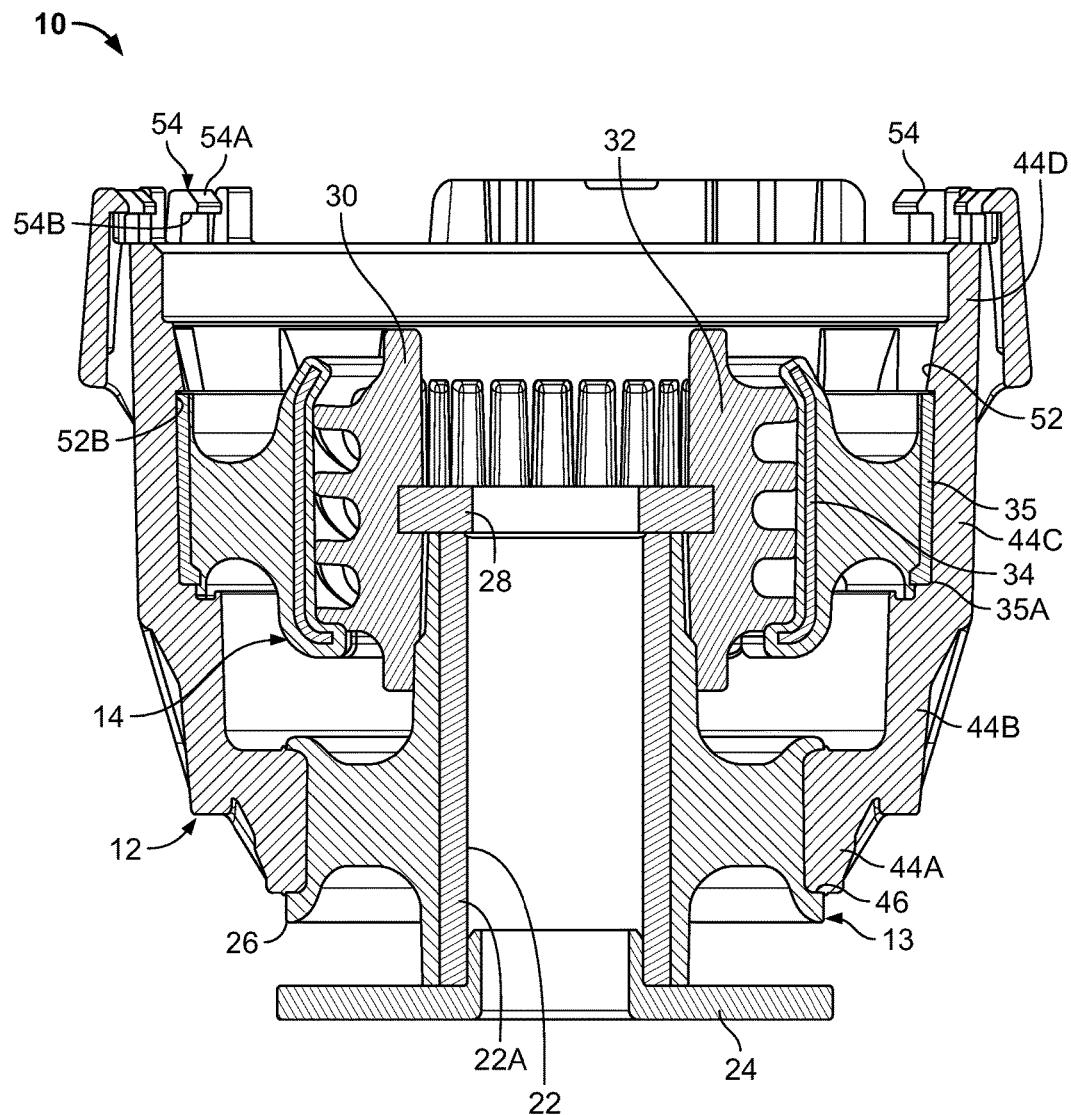
FIG. 10 is a cross-sectional view through the hydraulic damper after a second general assembly step with the first and second subassemblies attached to the housing.

With particular reference to FIG. 10, the hydraulic damper 10 of the present teachings is illustrated following a second general step in which the second subassembly 14 is attached to the housing 12. The sidewall 35 is adjacent to and radially surrounded by sidewall portion 44C of the housing 12. A lower end 35A of the sidewall 35 is axially adjacent to a step defined between the sidewall portion 44C and the sidewall portion 44B. The washer 28 axially abuts an upper end of the lower portion 22A of the center shaft 22. Downward positioning of the second subassembly 14 within the housing 12 may be limited by 1) the engagement between the sidewall 35 and the step defined between the sidewall portion 44C and the sidewall portion 44B; and/or 2) axial engagement between the washer 28 and the center shaft 22.

The housing 12 includes a first plurality of retention features 50 for receiving the second subassembly 14 in a snap-fit and securing the second subassembly 14 within the housing 12. In the embodiment illustrated, the first plurality of retention features includes a plurality of radial projections 52. The radial projections 52 extend radially inward from the sidewall 44. In the embodiment illustrated, the radial projections 52 extends radially inward from the sidewall portion 44C and may be integrally formed with the sidewall 44. In one particular embodiment, the housing 12 may be formed to include eight radial projections 52 equally spaced circumferentially about an inner side of the sidewall 44. It will be understood, however, that a greater or lesser number of radial projections 52 may be incorporated within the scope of the present teachings. As shown, each radial projection 52 may include a tapered lead-in surface 52A and an undercut 52B.

The second subassembly 14 is introduced into the housing 12 through an open upper end of the housing 12A. As the second subassembly 14 is downwardly displaced, at least one of 1) the radial projections 52; and 2) the second subassembly 14 is elastically deformed in a radial direction in response to a radial force.

Figure 11A:
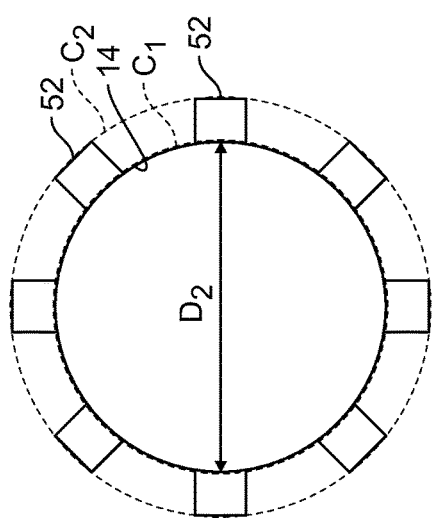
FIGS. 11A and 11B are schematic views illustrating elastic deformation of the second subassembly in response to a radial force.
Figure 11B:
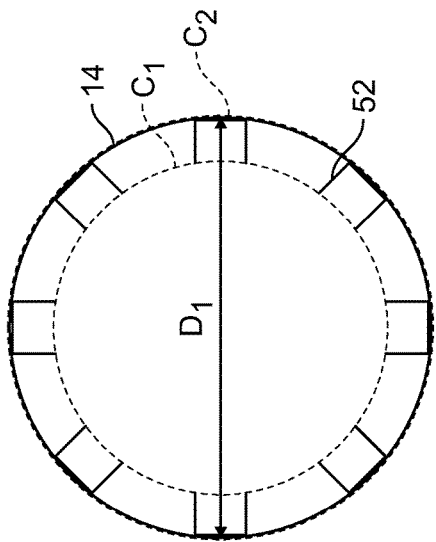

In the embodiment illustrated, the housing 12 and the radial projections 52 are substantially rigid such that there is little or no associated elastic deformation. As shown in the schematic views of FIGS. 11A and 11B, innermost portions of the radial projections 52 lie substantially on an imaginary circle $C_1$ (see the schematic FIG. 11A). Further in the embodiment illustrated, the second compliance member 32 of the second subassembly 14 is elastically deformable in the radial direction. Explaining further, the second compliance member 32 may be radially compressed such that the second subassembly 14 has a first outer diameter $D_1$ when it is not subject to any outside forces and a second outer diameter D, when acted upon by a radial force. The radial force may be a radial component of the force imparted by the lead-in surfaces 52A of the radial projections 52. In this manner, the second subassembly 14 may be downwardly displaced within the housing 12 to a position below the undercuts 52B of the radial projections 52.

After the second subassembly 14 axially passes the undercuts 52B, the inherent properties of the second compliance member 32 cause the second compliance member 32 to radially expand and thereby cause the second subassembly 14 to return to the first outer diameter $D_1$. The first outer diameter $D_1$ is greater than the imaginary circle $C_1$ on which innermost portions of the radial projections 52 are lying. The second outer diameter $D_2$ of the second subassembly 14 is less than the imaginary circle $C_1$. As shown in FIG. 10, the undercuts 52B of the projections radially extend over the upper end 35B of the sidewall 35 to thereby retain the second subassembly 14 within the housing 12.

Figure 2:
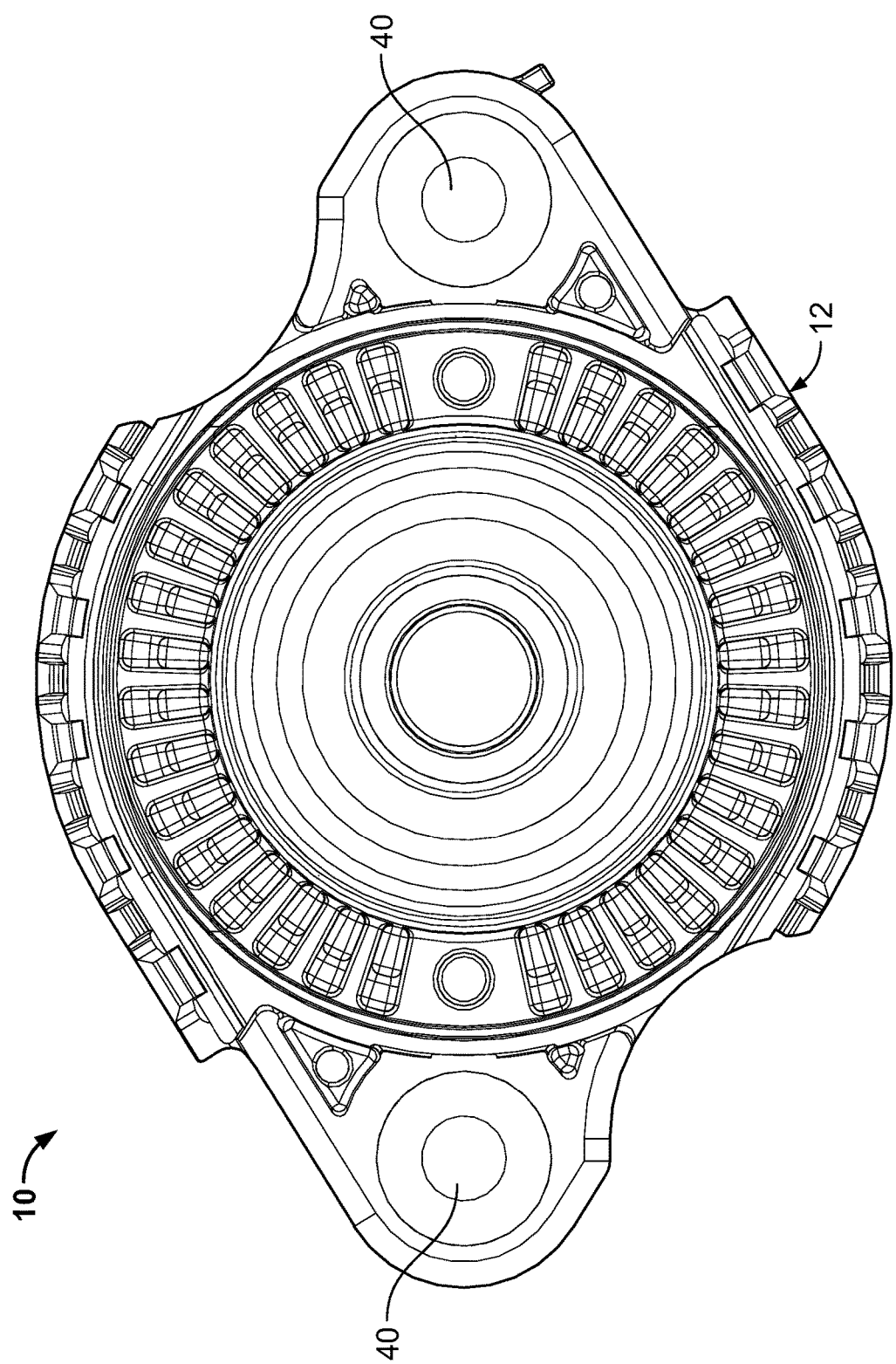
FIG. 2 is a top view of the hydraulic damper for a mount assembly FIG. 1.

With particular reference to FIGS. 1 and 2 and the cross-sectional view of FIG. 3, the hydraulic damper 10 of the present teachings is illustrated following a third general step in which the third subassembly 16 is attached to the housing 12. The housing 12 is illustrated to include a second plurality of retention features 54 for receiving the third subassembly 16 in a snap-fit and securing the third subassembly 16 within the housing 12. In the embodiment illustrated, the second plurality of retention features includes a plurality of projections or fingers 54. The fingers 54 axially extend upward from the upper end of sidewall 44 and may be integrally formed with the sidewall 44. In one particular embodiment, the housing 12 may be formed to include ten axially extending fingers 54 spaced circumferentially about the open upper end of the housing 12. It will be understood, however, that a greater or lesser number of axially extending fingers 54 may be incorporated within the scope of the present teachings. As shown, each axially extending finger 54 includes a radially extending portion having a tapered lead-in surface 54A and an undercut 54B (see FIG. 10, for example).

An axially extending guide member 56 is disposed between adjacent pairs of axially extending fingers 54. As compared to the axially extending fingers, the guide members 56 are formed without lead-in surfaces 54A and undercuts 54B. The guide members 56 may assist with alignment of the third subassembly 16 during assembly.

The third subassembly 16 is introduced into the housing 12 through the open upper end of the housing 12A. As the third subassembly 16 is downwardly displaced at least one of 1) the plurality of axially extending fingers 54; and 2) the third subassembly 16 is elastically deformed in a radial direction. In the embodiment illustrated, the housing 12 and the plurality of axially extending fingers 54 are elastically deformed in a radial direction. In other embodiments, however, the third subassembly 16 may alternatively elastically deform or may additionally elastically deform.

Figure 11C:
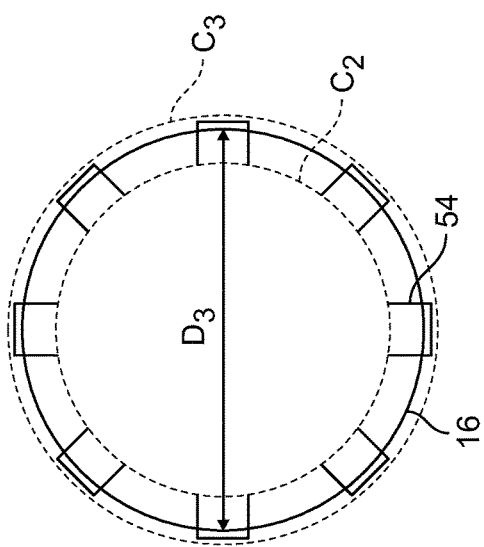
FIGS. 11C and 11D are schematic views illustrating elastic deformation of a second plurality of retention features in response to a radial force.
Figure 11D:
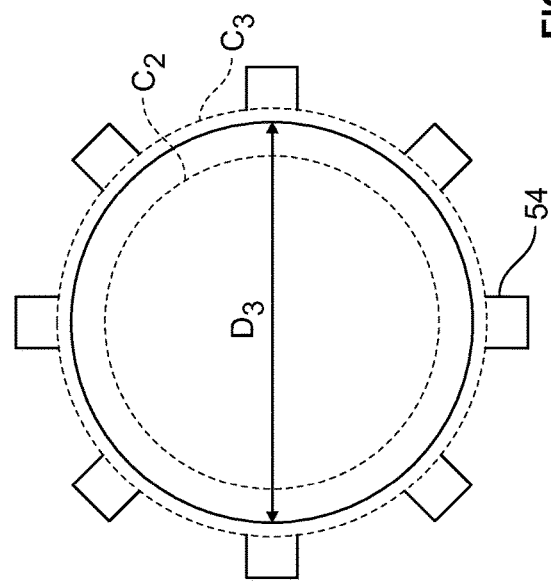

As schematically illustrated in FIGS. 11C and 11D, the lower ends of the lead-in surfaces 54B of the axial extending fingers 54 lie substantially on a second imaginary circle $C_2$ when not subject to any outside force and are radially displaceable to a third imaginary circle $C_3$ having a larger diameter when subject to a radially directed force. The radially directed force may be a radial component of the force imported by the third subassembly 16 on the plurality of axially extending fingers 54. In this manner, the third subassembly 16 may be downwardly displaced to a position below the undercuts 54B of the axially extending fingers 54.

After the third subassembly 16 axially passes the undercuts 54B, the inherent properties of the axial extending fingers 54 cause the axial extending fingers 54 to radially return from the third imaginary circle $C_3$ to the second imaginary circle $C_2$. An outer diameter $D_3$ of the third subassembly 16 is less than a diameter of the third imaginary circle $C_3$ but greater than a diameter of the second imaginary circle $C_2$. After the third subassembly 16 passes the undercuts 54B, the undercuts 54B of the axial extending fingers 54 radially extend over the upper end of the third subassembly 16 to retain the third subassembly 16.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A hydraulic damper for a mount assembly, the hydraulic damper comprising:

a housing defining a cavity, the housing integrally formed to include a plurality of retention features and a step; and a subassembly at least partially disposed in the cavity and secured relative to the housing by the plurality of retention features, the subassembly including a washer, an inertia track circumferentially surrounding the washer, a compliance member circumferentially surrounding the inertia track, the compliance member being elastically deformable in the radial direction, and a rigid outer sidewall having an upper end and a lower end, the rigid outer sidewall bonded to the compliance member;

wherein at least one of the plurality of retention features and the subassembly is elastically deformable in a radial direction from an initial diameter to an elastically deformed diameter such that the subassembly is sized to axially pass by the plurality of retention features for insertion of the subassembly into the housing, wherein the lower end of the rigid outer sidewall of the subassembly is adjacent to the step and the plurality of retention features radially extend over the upper end of the rigid outer sidewall of the subassembly to secure the subassembly relative to the housing.

2. A method of assembling the hydraulic damper of claim 1, the method comprising:

elastically deforming one of the plurality of retention features and the subassembly with a radially directed force from the initial diameter to the elastically deformed diameter;

inserting the subassembly into the housing axially past the plurality of retention features; and removing the radially directed force to positioning the plurality retention features axially over the subassembly.

3. The method of claim 2, wherein the subassembly includes a compliance member and elastically deforming one of the plurality of retention features and the subassembly includes elastically deforming the compliance member of the subassembly.

4. The method of claim 2, wherein elastically deforming one of the plurality of retention features and the subassembly includes elastically deforming the plurality of retention features.

5. The method of claim 2, wherein elastically deforming one of the plurality of retention features and the subassembly includes elastically deforming the subassembly.

6. The hydraulic damper of claim 1, further comprising:
a further plurality of retention features; and
a further subassembly at least disposed in the cavity and secured relative to the housing by the further plurality of retention features;
wherein the further subassembly includes a shaft, a further compliance member circumferentially surround the shaft, and an end cap carried at a radially outer portion of the further compliance member, the further compliance member being elastically deformable in the radial direction.

7. The hydraulic damper of claim 6, wherein the further plurality of retention features includes a plurality of axially extending fingers axially extending from a sidewall of the housing.

8. The hydraulic damper of claim 6, wherein the further subassembly includes a shaft, a compliance member circumferentially surround the shaft, and an end cap carried at a radially outer portion of the compliance member, the compliance member being elastically deformable in the radial direction.

9. The hydraulic damper of claim 1, wherein the plurality of retention features is elastically deformable in the radial direction from the initial diameter to the elastically deformed diameter.

10. The hydraulic damper of claim 9, wherein the plurality of retention features each include a radially innermost portion on a first imaginary circle having a first diameter when the plurality of retention features are in the initial diameter and the radially innermost portions are on a second imaginary circle having a second diameter when the plurality of retention features are in the elastically deformed diameter, the subassembly having an outer diameter greater than the first diameter and less than the second diameter.

11. The hydraulic damper of claim 1, wherein the subassembly is elastically deformable in the radial direction from the initial diameter to the elastically deformed diameter.

12. The hydraulic damper of claim 11, wherein the plurality of retention features each include a radially innermost portion on an imaginary circle having an imaginary circle diameter, the initial diameter of the subassembly being greater than the imaginary circle diameter, the elastically deformed diameter of the subassembly being less than the imaginary circle diameter.

13. The hydraulic damper of claim 1, wherein the retention features of the plurality of retention features each includes a lead-in surface and an undercut.

14. The hydraulic damper of claim 1, wherein the plurality of retention features includes a plurality of radial projections inwardly extending from a sidewall of the housing.

* * * * *